US008379922B2

United States Patent
Tzur et al.

(10) Patent No.: US 8,379,922 B2
(45) Date of Patent: *Feb. 19, 2013

(54) DETECTING OBJECTS IN AN IMAGE BEING ACQUIRED BY A DIGITAL CAMERA OR OTHER ELECTRONIC IMAGE ACQUISITION DEVICE

(75) Inventors: Meir Tzur, Haifa (IL); Ben-Zion Shaick, Zichron-Yaakov (IL); Itsik Dvir, Haifa (IL); Victor Pinto, Zychron-Yaakov (IL)

(73) Assignee: CSR Technology, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,304

(22) Filed: May 2, 2011

(65) Prior Publication Data
US 2011/0205387 A1 Aug. 25, 2011

Related U.S. Application Data

(63) Continuation of application No. 12/023,877, filed on Jan. 31, 2008, now Pat. No. 7,961,908.

(60) Provisional application No. 61/016,205, filed on Dec. 21, 2007.

(51) Int. Cl.
*G06K 9/00* (2006.01)
*H04N 5/225* (2006.01)
*G06K 9/68* (2006.01)

(52) U.S. Cl. ........................ 382/103; 382/218; 348/222.1

(58) Field of Classification Search .................. 382/100, 382/103, 106, 112–119, 123, 137, 140, 151, 382/159, 161, 165, 178–189, 196, 200–203, 382/209, 215, 218, 219, 224, 227, 228, 231, 382/232, 254–287, 290–294, 301, 305, 309, 382/314; 345/30, 55; 358/296; 700/133; 704/200, 207, 208, 211, 260, 270, 500, 503; 705/1.1; 706/6, 12, 20; 348/222.1, E05.024
See application file for complete search history.

(56) References Cited

U.S. PATENT DOCUMENTS

| | | | |
|---|---|---|---|
| 6,356,649 | B2 | 3/2002 | Harkless et al. |
| 6,639,998 | B1 | 10/2003 | Lee et al. |
| 6,924,832 | B1 | 8/2005 | Shiffer et al. |
| 6,990,239 | B1 | 1/2006 | Nelson |
| 6,999,625 | B1 | 2/2006 | Nelson |
| 7,016,532 | B2 | 3/2006 | Boncyk et al. |

(Continued)

OTHER PUBLICATIONS

Co-Pending U.S. Appl. No. 12/023,877, filed Jan. 31, 2008.

(Continued)

*Primary Examiner* — Hadi Akhavannik
*Assistant Examiner* — Mehdi Rashidian
(74) *Attorney, Agent, or Firm* — Perkins Coie LLP (57) ABSTRACT

The likelihood of a particular type of object, such as a human face, being present within a digital image, and its location in that image, are determined by comparing the image data within defined windows across the image in sequence with two or more sets of data representing features of the particular type of object. The evaluation of each set of features after the first is preferably performed only on data of those windows that pass the evaluation with respect to the first set of features, thereby quickly narrowing potential target windows that contain at least some portion of the object. Correlation scores are preferably calculated by the use of non-linear interpolation techniques in order to obtain a more refined score. Evaluation of the individual windows also preferably includes maintaining separate feature set data for various positions of the object around one axis and rotating the feature set data with respect to the image data for the individual windows about another axis.

19 Claims, 7 Drawing Sheets

U.S. PATENT DOCUMENTS

| | | | |
|---|---|---|---|
| 7,020,337 | B2 | 3/2006 | Viola et al. |
| 7,050,607 | B2 | 5/2006 | Li et al. |
| 7,099,510 | B2 | 8/2006 | Jones et al. |
| 7,197,186 | B2 * | 3/2007 | Jones et al. .................. 382/224 |
| 7,221,809 | B2 | 5/2007 | Geng |
| 7,835,549 | B2 * | 11/2010 | Kitamura et al. ............. 382/118 |
| 2002/0102024 | A1 | 8/2002 | Jones et al. |
| 2004/0013304 | A1 | 1/2004 | Viola et al. |
| 2004/0258313 | A1 * | 12/2004 | Jones et al. .................. 382/224 |
| 2005/0100195 | A1 | 5/2005 | Li |
| 2006/0215905 | A1 | 9/2006 | Kitamura et al. |
| 2007/0014434 | A1 * | 1/2007 | Wei et al. ..................... 382/104 |
| 2007/0154095 | A1 | 7/2007 | Cao et al. |
| 2007/0226255 | A1 | 9/2007 | Anderson |
| 2007/0237387 | A1 * | 10/2007 | Avidan et al. ................. 382/159 |
| 2007/0282682 | A1 * | 12/2007 | Dietz et al. ...................... 705/14 |
| 2008/0177994 | A1 * | 7/2008 | Mayer .............................. 713/2 |
| 2009/0222329 | A1 * | 9/2009 | Ramer et al. .................... 705/10 |
| 2011/0150334 | A1 * | 6/2011 | Du et al. ........................ 382/173 |
| 2011/0258049 | A1 * | 10/2011 | Ramer et al. ............... 705/14.66 |

OTHER PUBLICATIONS

Notice of Allowance Mailed Mar. 28, 2011 in Co-Pending U.S. Appl. No. 12/023,877, filed Jan. 31, 2008.

* cited by examiner

Transfer Function Synthesized from
Elementary Parabolas

DETECTING OBJECTS IN AN IMAGE BEING ACQUIRED BY A DIGITAL CAMERA OR OTHER ELECTRONIC IMAGE ACQUISITION DEVICE

This is a continuation of U.S. patent application Ser. No. 12/023,877, filed on Jan. 31, 2008, which claims the benefit of U.S. Provisional Patent Application No. 61/016,205, filed on Dec. 21, 2007, both of which are incorporated herein by reference.

BACKGROUND

This application relates to the acquisition of image data by digital cameras and other electronic image acquisition devices, and, more specifically, to detecting the presence of a defined type of object within the image.

Electronic cameras image scenes onto a two-dimensional sensor such as a charge coupled-device (CCD), a complementary metal-on-silicon (CMOS) device or other type of light sensor. These devices include a large number of photodetectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. Color data are most commonly obtained by using photodetectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge, a flash memory card, a recordable optical disk or a hard magnetic disk drive. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing also includes de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminescence of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is made up by increasing the size of the aperture or the gain of the sensor, or both, in order to obtain the data within a certain luminescence range. An increased aperture results in an image with a reduced depth of field and increased optical blur, and increasing the gain causes the noise within the image to increase. Conversely, when the scene is brightly lighted, the aperture and/or gain are reduced and compensated for by increasing the exposure time, the resulting image having a greater depth of field and/or reduced noise. In addition to analog gain being adjusted, or in place of it, the digital gain of an image is often adjusted after the data have been captured.

Other processing that may also be performed by electronic cameras includes a detection of the likelihood that a certain type of object is present within the image. An example object is a human face. When there is a likelihood that the object is present in the image, its location is also determined. This allows the camera to act differently upon that portion of the image during acquisition and/or processing of the acquired data.

SUMMARY

Primarily because of the large amount of data processing performed by a typical digital image capturing device, it is highly desirable that any processing to detect the presence of a certain object or objects in the image be done efficiently, using a minimum amount of hardware resources and performing the processing in a short amount of time.

In a method of detecting a likelihood that an object of a particular type is present within an image being captured, the image frame is divided into windows which preferably overlap each other. The image data within the individual windows are preferably evaluated independently of the data of other windows. Those window data are evaluated with respect to data stored in the camera of multiple feature sets representative of the object, one feature set at a time, to generate individual scores for the windows as to the likelihood that at least a portion of the object is present in the window. Typically, the first feature set is relatively simple and subsequent feature sets become more complicated with respect to characteristics of the object.

All of the windows of a given image are usually evaluated with respect to the first feature set but only those windows having the highest scores as a result of this first round of evaluation, such as those over a preset level, are then evaluated with respect to the second feature set. Any subsequent evaluation with respect to a third or more feature sets also process only data of windows having the highest score from the immediately preceding round of evaluation. By rejecting windows right away that cannot contain the object, the amount of data processing is significantly reduced.

As part of the individual window evaluations, a score results of from the evaluation of the image data with respect to the feature set data. Rather than simply increasing the score by one of two amounts by using only pass/fail criteria, non-linear interpolation between these two amounts is preferably utilized for evaluations that do not clearly result in one or the other of the two amounts. This improves the accuracy of the evaluations.

Also as part of the individual window evaluations, relative rotation between the window image and that of the stored feature set is preferably performed. This enables detection of the object over a range of rotations with respect to the image frame. Rather than rotating the image data with respect to the fixed feature set data, this rotation may be performed the other way around. That is, the feature set may be rotated by changing a parameter, such as a constant, of the stored feature set data. This feature set rotation is preferably performed at least in a plane of the x and y-axes, about the z-axis extending out of the surface of the image.

Rotation of the image about an axis passing through the object image may effectively be accomplished by providing the data of each feature set for a number of different rotational positions of the object. The image data for an individual window are then correlated with the stored feature set data for each of the number of rotational positions. Typically, feature set data are stored for several distinct rotational positions of the object about at least the y-axis.

As part of detecting the likelihood that the designated type of object is part of the image, its location within the image is determined since the evaluation has been performed on individual windows whose positions within the image are known. The camera may then use this information to advantage in one or more ways during acquisition of the image, during image processing after acquisition, or both. It may automatically focus on the object, overriding other focusing criteria normally used by the camera. The camera may also adjust the exposure of the image to take characteristics of the object into account. Color correction of the object may also be provided. A popular application of the object detection techniques herein is when the human face is the object, which is the example used, but it will be recognized that these techniques are not limited to faces but rather have application to a wide variety of different types of objects.

Additional objects, features and advantages of the various aspects of the present invention are included in the following detailed description of exemplary embodiments thereof, which description should be taken in conjunction with the accompanying drawings. All patents, patent applications, articles, other publications and things referenced herein are hereby incorporated herein by this reference in their entirety for all purposes. In the event of any conflict in the definition or use of terms herein with those of an incorporated document or thing, the definition and use herein shall prevail.

DESCRIPTION OF EXEMPLARY EMBODIMENTS

Electronic Camera Example

Figure 1:
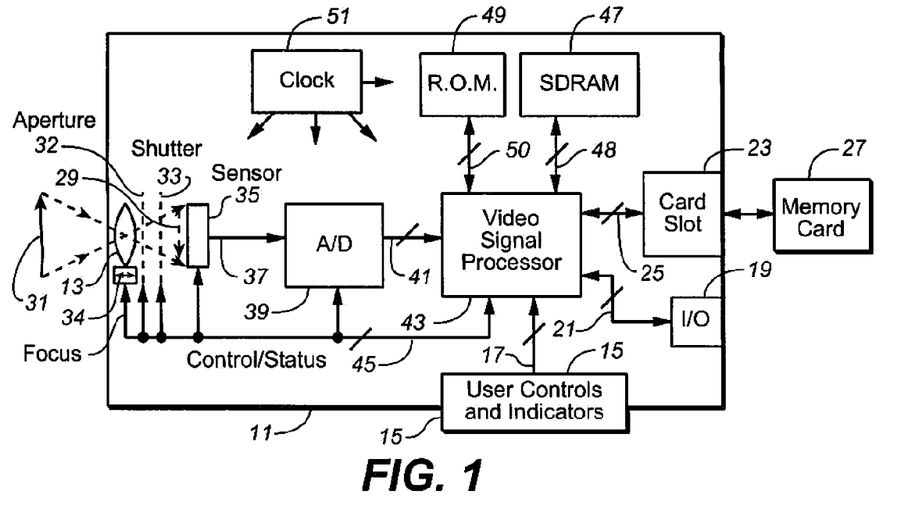
FIG. 1 illustrates a digital camera or other image acquisition device in which the object detection techniques described herein may be implemented.

In FIG. 1, an example of an electronic camera in which object detection techniques may be implemented is schematically shown, which may be a still camera or a video camera. It includes a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an internal non-volatile memory (not shown). Image data may also be outputted to another video device through the receptacle 19. The memory card 27 can be a commercially available semiconductor flash memory, small removable rotating magnetic disk or other non-volatile memory to which image data can be written by the camera.

The optical system 13 can be a single lens, as shown, but can alternatively be a set of lenses. An image 29 of a scene 31 is formed in visible optical radiation through an aperture 32 and a shutter 33 onto a two-dimensional surface of an image sensor 35. A motive element 34 moves one or more elements of the optical system 13 to focus the image 29 on the sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of image data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

The photo-detectors of the sensor 35 typically detect the intensity of the image pixel striking them in one of two or more individual color components. Early sensors detected only two separate colors of the image. Detection of three primary colors, such as red, green and blue (RGB) components, is now common. Currently, image sensors that detect more than three color components are becoming available.

Processing of the image data in circuits 41 and control of the camera operation are provided, in this embodiment, by a single integrated circuit chip 43 (which may also include the analog-to-digital converter instead of using the separate circuit chip 39). These functions may be implemented by several integrated circuit chips connected together but a single chip is certainly preferred. In addition to being connected with the circuits 17, 21, 25 and 41, the circuit chip 43 is connected to control and status lines 45. The lines 45 are, in turn, connected with the aperture 32, shutter 33, focus actuator 34, sensor 29, analog-to-digital converter 39 and other components of the camera to provide a synchronous operation of them. Signals in the lines 45 from the processor 43 drive the focus actuator 34 and set the size of the opening of the aperture 32, as well as operate the shutter 33. The gain of the analog signal path is also set by the processor 43 through the lines 45. This gain typically takes place in the analog-to-digital converter which, in the case of a CCD sensor, is part of the sensor, or in the case of a CMOS sensor, may be part of a separate analog-to-digital converter as shown in FIG. 1.

A separate volatile random-access memory circuit chip 47 is also connected to the processor chip 43 through lines 48 for temporary data storage. Also, a separate non-volatile memory chip 49 is connected to the processor chip 43 through lines 50 for storage of the processor program, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips therein and other components. Rather than a separate component, the clock circuit for the system may alternatively be included on the processor chip 43.

Figure 2:
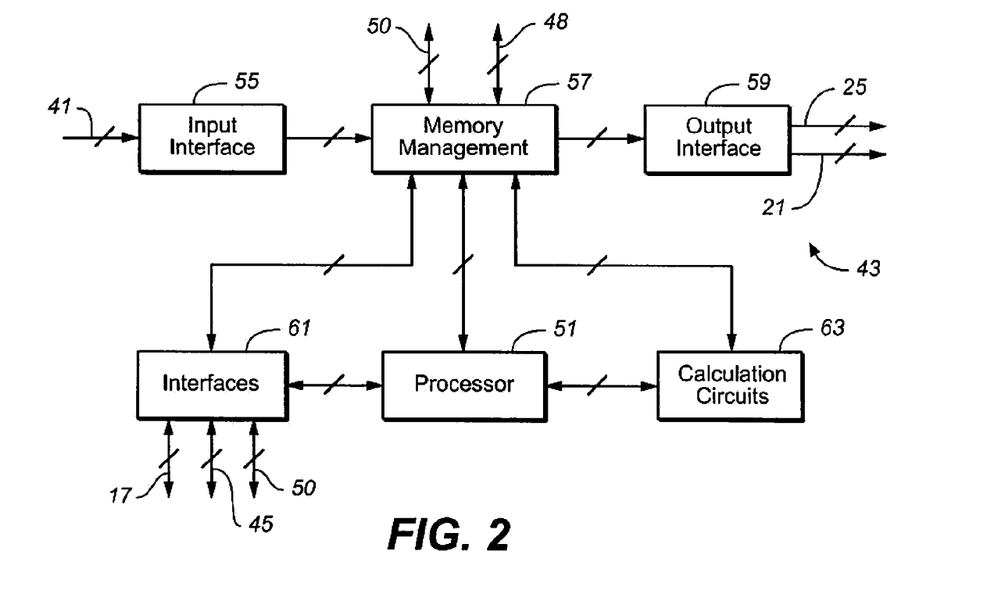
FIG. 2 is a block diagram of some of the functional components of the image signal processor of the device of FIG. 1.

A general block diagram of the processor chip 43 is given in FIG. 2. A processor 51, which may be general purpose or dedicated to the tasks herein, performs calculations on the image data and controls operation of the camera, in response to firmware stored in the flash memory 49 (FIG. 1). Digital data of successive image frames are received over lines 41 by an interface circuit 55 through input contacts on the chip 43, and are then communicated with other system components by connection through a memory management unit 57. Image data of captured image frames are outputted through an interface circuit 59 to lines 21 (to the input-output receptacle 19 of FIG. 1) and 25 (to the flash memory card slot 23 of FIG. 1) that are connected to output contacts on the chip 43. Interface circuits 61 communicate between the lines 17, 45 and 50 (see FIG. 1) and the processor 51 and memory management unit 57.

Circuits 63 of FIG. 2, also connected with the processor 51 and memory management unit 57, are optionally included to do at least some of the calculations necessary to carry out the usually extensive data processing that is being performed by the camera. The processor 51 may make all the calculations under control of firmware stored in the camera but the use of dedicated circuits to at least make the most repetitive calculations is usually preferred.

Overall Object Detection Processing

Figure 3:
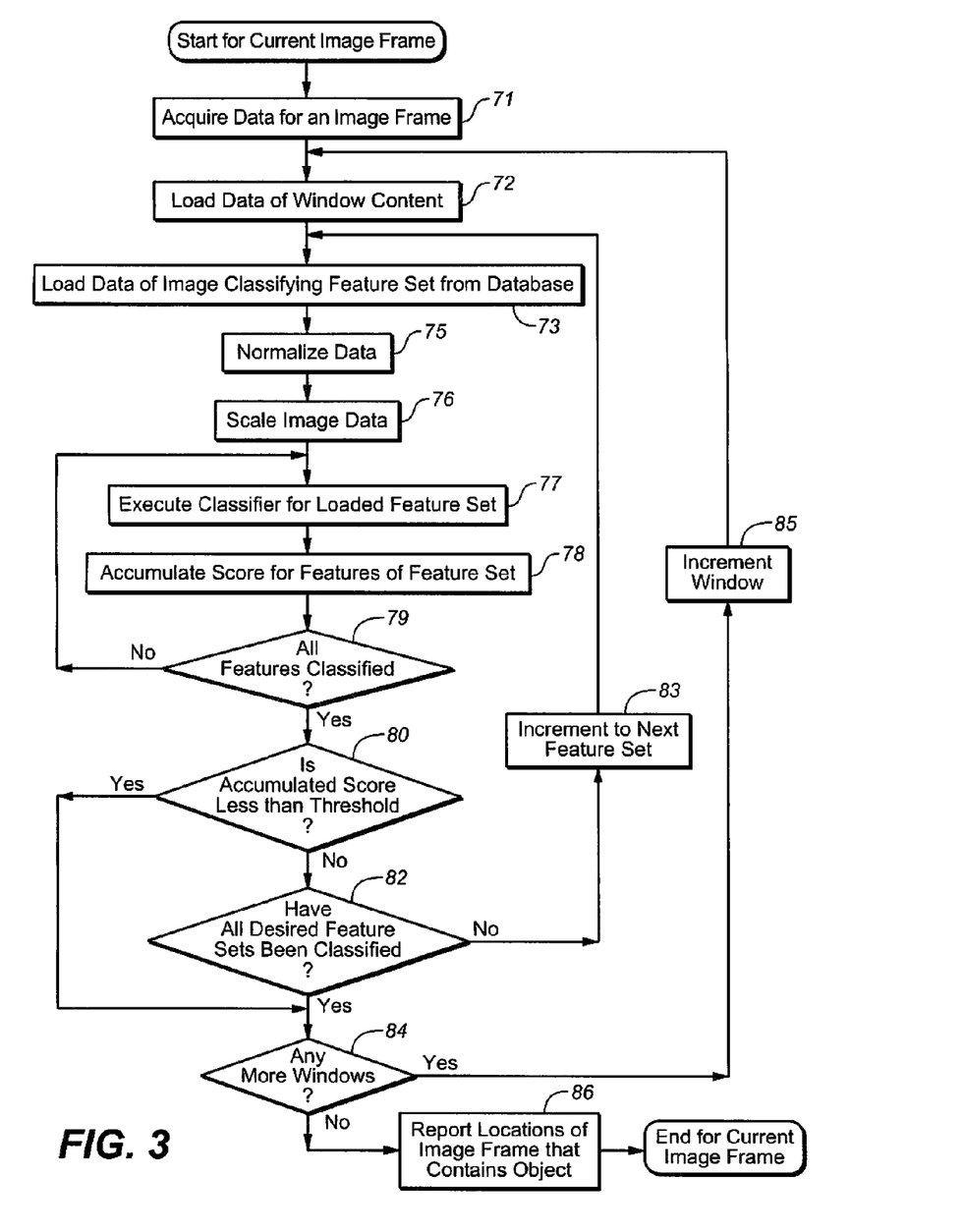
FIG. 3 is a flowchart of processing carried out by the camera of FIGS. 1 and 2 to detect the likelihood that a particular type of object is present in an image being acquired.

Referring to FIG. 3, a general outline of the processing to detect the existence of a face or other specific type of object in a given image is given, followed by details about several of the processing steps. A first step 71 is to obtain data for the image frame. The processing described herein is performed on data of one image frame at a time. These data can be of an image of a scene prior to the picture being taken if information of the existence and location of the object are being used by the camera to focus, set exposure parameters or for some other purpose prior to capturing an image. The image data, for example, can be obtained when the shutter button is pressed only partway down, resulting in the object detection processing being performed on a slightly different image than that captured by the camera when the shutter button is pressed the whole way down. Alternatively, these data can be those of the captured image if object detection is being used to process acquired image data such as to adjust the color balance. In a preferred technique, rather than responding to a partial depression of the shutter, the processing illustrated in FIG. 3 is carried out on an individual preview image, as discussed further below. In this case, data of one preview image frame is obtained in step 71 from a sequence of preview images that are automatically acquired by the normal operation of the camera.

Figure 4:
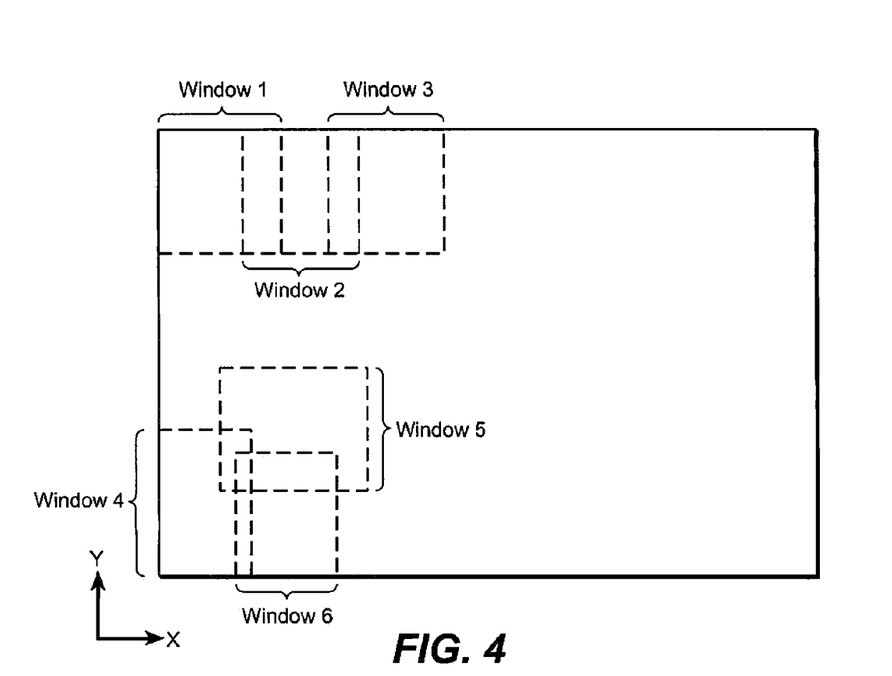
FIG. 4 shows an image divided into windows that are individually evaluated.

The image is preferably divided into individual windows in order to be able to separately process the data of each window. This is illustrated in FIG. 4, wherein boundaries of windows are defined within an image frame, as described below. Data of one of these windows is loaded in a step 72.

A database stored within a non-volatile memory of the camera contains data of two or more sets of image features that are used in respective two or more processing stages to classify the individual windows as likely or not to contain at least a portion of the face or other object. In a step 73, data of a first of these feature sets is loaded into the processor memory. Each feature set includes data of two or more individual features of the face or other object being detected. This first set contains the most general features, in order to do a first pass of classifying the image with relatively simple processing. One or more other feature sets are later used to more specifically determine the likelihood that the object exists in the individual windows, and typically requires more processing and time to complete.

The brightness of the image within the current window is normalized, as indicated in a step 75, without use of data from any of the other windows. The image of that window is then scaled as part of determining the degree to which this image portion matches the particular feature with which it is being compared, as indicated in step 76. Specific exemplary techniques of scaling are described below. In scaling, the size of the image is altered to place it on the same scale as the features with which the image is later compared. Alternatively, the feature set data could be changed in scale to match that of the image.

In a step 77, the scaled and normalized data of the current window are then evaluated with respect to the loaded data of the individual features of the first feature set. The result is a numeric score with a value that represents a level of correlation between the portion of the image bounded within the current window and the individual features of the first set. The scores from the first feature set evaluation are stored, in a step 78, and the scores from all evaluations of the other features of the given feature set are then added to it. The high scores result from a determination that there is a high likelihood that the object is present within the current window, and low scores from a determination of a low likelihood of the object's presence. Additional details of this classifying step are given below.

The steps 77 and 78 are typically carried out many times to completely evaluate an image window, once for each of multiple features in each of multiple feature sets. In order to reduce the amount of processing, however, the later comparisons of the image with the individual features may be limited to areas of the image determined during evaluation of earlier features to possibly contain the object. Conversely, areas of the image determined early in the processing to not contain the object may be excluded from further evaluation with respect to additional feature sets.

After the current window of the image has been evaluated in steps 76 and 77 with respect to a specific feature, it is determined in a step 79 whether there are any more features of the current feature set that are yet to be evaluated. If so, the processing returns to the classifying step 77 for comparison of the image with the new feature in the same manner as described above. If not, in a step 80, after the image has been evaluated with respect to all the features of one feature set, the scores accumulated in the step 78 are compared with a threshold established specifically for the feature set just completed. This threshold is typically empirically determined and stored as part of the feature set data. If the score is less than this threshold, it is determined in the step 80 to reject the window, in which case processing of image data within that window ceases and moves through a step 84 to process data of another window yet unprocessed. But if the score is equal to or greater than the threshold, the processing proceeds from the step 80 to a step 82.

After completion of processing for one feature set of a window that is not rejected by the step 80, the next step 82 determines whether there are any further feature sets with which data of the current image window have not yet been processed and it is determined to be desirable to do such further processing. If so, the processing increments to the next feature set, in a step 83, and then begins by loading data of that feature set in the step 73. The processing described above with respect to the steps 75-80 is then repeated for this other feature set, except that the normalization step 75 and the image scaling step 76 are typically not repeated. If the scaling 76 is performed by scaling data of the image, it usually needs to be done only once for each window. The image scale initially determined for a given window may then be used during classification of the image portion in that window with respect to subsequent features.

Once it is determined by the step 82 that the current image window has been classified with respect to all of the feature sets, or some desired set of less than all the feature sets, then it is determined in a step 84 whether all the desired windows of the image have been processed. If not, another window not yet processed is pointed to at a step 85, and the processing returns to the step 72 where the data of the image within that window are processed in the same manner as described above. Once it is determined in the step 84 that all the desired windows have been processed and classified, the results are reported in a step 86. Those windows of the current image frame that have been identified as target windows (that is, those not rejected by the step 80 and therefore likely to contain an image of the object) are reported. The existence and location within the image frame of the face or other object of interest has then been determined.

Scaling

As part of one specific technique for carrying out the scaling step 76, the image may be divided into individual windows in order to be able to separately process the data of each window. This is illustrated in FIG. 4, wherein boundaries of windows are defined within an image frame. The windows may be non-overlapping but it is preferred that they overlap each other. One way to define window boundaries is illustrated by a row of windows 1, 2 and 3 extending in the x-direction across the top of the window. This is a regular pattern of a common sized window that can be repeated over the entire image frame with the rows also overlapping in the y-direction. Windows 4, 5 and 6 illustrate a different type of pattern, where the windows have various sizes and positions that form a non-regular pattern. Whatever the specific pattern, or combinations of patterns, the windows preferably cover the entire image frame.

As part of evaluating whether an object is within a given window, the portion of the image within the window is demagnified in steps to make it smaller. At each step, the data of the image are classified (step 77) by use of data of the feature currently being evaluated. Conversely, the data of the feature may be magnified in steps and compared with data of the image within the window at each step. The result in either case is to determine whether the window contains the object, and if so, optionally where within the window that the object is positioned. Usually, each scaled image is processed independently of the others, and the decisions about the presence or not of objects in each scale are then combined to make a final decision. It is determined in the step 80 whether the accumulated score for a particular feature set exceeds the predetermined threshold or not. This is the result of the processing of FIG. 3 for a particular window. It is then repeated for every other window of the image If the cumulative score is less than this threshold for a first or subsequent feature set, a decision can be made that the object is not within this window. In a preferred embodiment, this window is then eliminated from any further object detection processing. This results in pruning windows from further processing with respect to any remaining feature sets, and thus reduces the amount of processing that is necessary to detect the presence of the object within the image frame. A first stage of the processing has then been completed.

However, if the cumulative score is equal to or higher than the threshold, the processing continues in a second stage by repeating steps 73-80 on the image data within the current window for a second feature set, except, as described above, the steps 75 and 76 may be omitted after completing processing of the first feature for any specific window. The threshold may again be exceeded, in which case a third stage of processing is repeated with a third feature set, if used, or rejected, in which case processing on image data of the current window terminates. If not earlier rejected, the current window data are evaluated with respect to a finite number of feature sets, which can be as many as ten or twenty or more, after which the processing for the current window ends. The same processing is then performed for each other desired window, in sequence, until all such windows have been evaluated.

Figure 5:
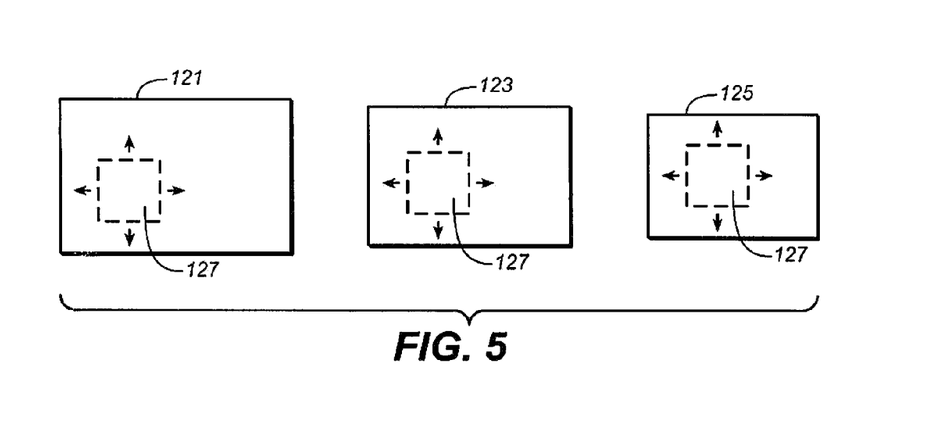
FIG. 5 provides an example of the processing of image data within one of the windows of FIG. 4.

A specific technique that may be used for processing the data of the individual image windows as part of the step 76 (FIG. 3) will now be described. A window of the image can be incrementally reduced in size in steps, the image of each size being compared with the data of the one feature. Two or more such image sizes are used but many more, such as ten or more, may be used. Three such image sizes are shown in FIG. 5. Image 121 may be full scale, while an image 123 is reduced in size and an image 125 is reduced even further. An observation window 127, smaller than the reduced sized images, is then scanned over the image and the processing of step 77 performed to determine whether the object exists in the portion of the images 121, 123 and 125 defined by the window 127. The feature is sized in the feature data to be that of the observation window 127. On the other hand, the windowed image may be sized to match the constant size of the classifier 77.

As part of this technique, there may be a number of specific image reduction sizes defined, fourteen for example. When performing the processing of FIG. 3 for the first one or several feature sets, some of these may be omitted. An example is to skip every other one, thereby processing the image data in fewer different sizes at the beginning in order to minimize the processing. In the example of fourteen different sizes, only seven would then be processed during evaluation of the earlier feature sets, perhaps as many as one-half of them. For example, if there are twenty-two stages of processing (one feature set per stage), then every other of the defined scaled image sizes may be processed in each of the first ten or eleven stages and all of them processed in each of the remaining stages. This technique results from the observation that the same object is usually detected in several of the scaled images, particularly in the initial stages. So objects are not missed by processing fewer scaled images in the beginning. A role of the first processing stages, which typically also individually include a fewer number of features, is to quickly eliminate from contention any windows that do not contain an object being detected.

It will be noted that the techniques described with respect to FIGS. 3-5 reduce the amount of processing necessary to reach this desired result. First, the image of the current window is compared in multiple sizes (different scales) with the feature data a fewer number of times in initial stages of the processing than in the later stages, instead of making the processing in each stage the same. Second, the level of correlation is compared with a threshold after evaluation of the window with respect to each feature set so that the data of that image window need not be further processed if the threshold is not met early in the processing. The feature set used in each successive round becomes more detailed and complicated in order to increase the likelihood of identifying only those windows likely to contain the object. Although this must be traded off against the additional processing time required for the subsequent stages, the later processing is reduced because of the early elimination of many windows as potential target windows.

In the processing described with respect to FIG. 3, it will be noted that the cumulative scores of each window are calculated by use of image data of only that window. An individual window is not scored on its relationship with other windows. Further, it will be noted that the window boundaries preferably remain the same during each stage of the processing. Once defined for a particular image, the window boundaries are preferably not changed during all of the classifying processing for that image.

Image Orientation

As part of executing the image classifier (step 77 of FIG. 3) for the individual windows, relative rotation of the image data and the feature set being processed preferably takes place in order to find the rotational position that gives the highest correlation. It is for that relative orientation of the image and the feature set that the likelihood of the object of interest being present in the image window is determined.

The object type and its orientation are first detected. After detecting the type and z-axis ("yaw") orientation, a single, combined specific classifier, responsive to the detected type and z-axis orientation, is selected from a database of classifiers. This classifier is then used to decide whether the window contains the specified object or not. Note that in a preferred embodiment of the invention, the z-axis orientation is accounted for by rotating a parameterized feature set used by the specific type classifier chosen, not by rotating the images input to this type classifier, or by using a plurality of z-axis oriented classifiers of the specific object type.

Figure 6:
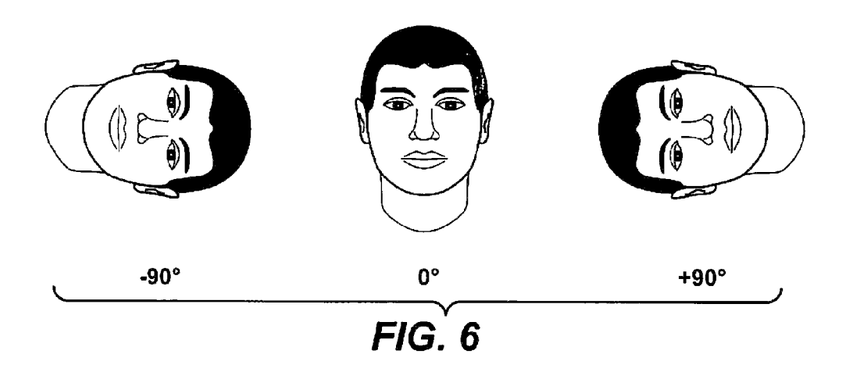
FIG. 6 illustrates different rotational positions of the object in the image plane relative to that of the stored feature sets.

With reference to FIG. 6, a specific example of relative rotation of the image and data of the feature set in the surface of the image is shown. Although the image may be rotated with respect to the feature set, the relative rotation is preferably done in the reverse. In a specific example, the feature set is rotated through three orientations with respect to the image, as illustrated in FIG. 6. In a preferred implementation, the data of the feature set may include a parameter, such as a constant, that is sequenced through three values to orient the feature set at the default 0°, −90° and +90°, through a z-axis perpendicular to the image's x-y plane and extending outward toward the viewer.

Figure 7:
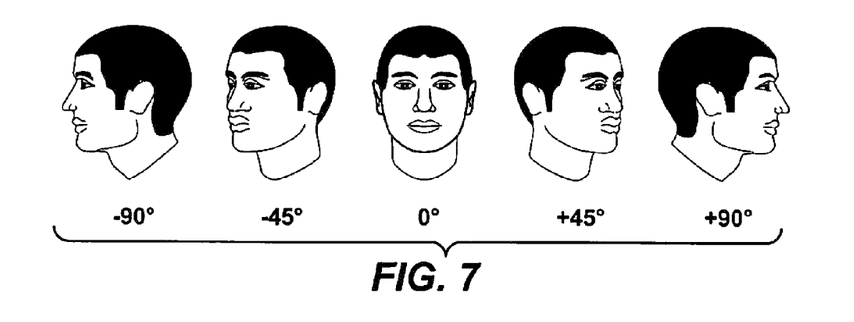
FIG. 7 illustrates different rotational positions of the stored feature sets around the z-axis relative to that of the object.

With reference to FIG. 7, several, in this case five, relative positions of the object being sought are shown about an axis that passes through the object in or parallel with the image plane, such as the y-axis. Data of the feature sets are preferably maintained as parameterized feature sets, one feature set for each of the several designated rotational positions. This, in effect, rotates the feature set data with respect to the image data. The use of parameterized feature set data is therefore preferred over simply providing relative rotation between a single object feature set and data of the window being analyzed about the y-axis.

In the example of FIG. 7, each one of these classifiers detects the object of interest rotated at one of five selected angles about a y-axis that extends through the object in the plane of the image. In this preferred implementation, these five angles are a default 0°, the object rotated around the y-axis to −45° with respect to the default position, the object rotated around the y-axis to −90° with respect to the default position, the object rotated around the y-axis to +45° with respect to the default position, and the object rotated around the y-axis to +90° with respect to the default position. The selected one of the five feature sets, in combination with the object rotation about the z-axis determined as illustrated in FIG. 6, determines the type of image within the window.

A system operating according to the specific example illustrated in FIGS. 6 and 7, is therefore able to detect fifteen different object scenarios: five y-axis rotational types (−90°, −45°, 0°, +45° and +90°) in and out of the plane of the image, each with three possible orientations (−90°, 0° and +90°) around the z-axis emanating towards the reader. Thus, fifteen different object orientations are examined as part of the classifier step 77 of FIG. 3. For each of the five different image feature sets of FIG. 7, the parameterized feature set is rotated among the three positions shown in FIG. 6. One of the fifteen possible orientations is selected for an individual window to provide the greatest confidence that the object is present in the window. However, this rotational processing usually needs to be done only once for each window, in the first processing stage. The orientation of the object that is calculated in the first stage is then used in the processing of step 77 for each of the subsequent stages.

Cumulative Score Calculations

A major part of the steps 77 and 78 of FIG. 3 is to adjust a cumulative score by an amount representative of the results of the evaluation of the image data within the current window with respect to data of a current feature set, as described above. Rather than simply increasing the window score by some fixed amount if a calculated result of the evaluation of a feature is greater than a single set threshold and nothing or some other fixed amount if less than the threshold, two thresholds are preferably used. If the evaluation result is greater than the higher threshold, then the score is increased by a first pre-set amount but if less than the lower threshold, the score is increased a second pre-set amount. If the evaluation result is in between the two thresholds, the score is increased by an amount determined by interpolating between the first and second pre-set amounts. The interpolation is preferably non-linear. This improves the accuracy of the individual window evaluations.

To explain this mathematically, the cumulative score of a given window may be represented as follows:

$$CumulativeScore = \sum_{i=1}^{N} G_i(I) \quad \text{(Equation 1)}$$

where $I_i$ is the current window and N is the number of features in the current feature set. Others have maintained a cumulative score by defining $G_i$ (I) by the following linear but discontinuous function:

$$G(I) = \begin{cases} \alpha_i & \text{if } F(v_i, I) > \theta_i \\ \beta_i & \text{otherwise} \end{cases} \quad \text{(Equation 2)}$$

where $\alpha_i$, $\beta_i$ and $\theta_i$ are constants determined during a calibration procedure, $v_i$ is a projection vector of the stored feature set against which the current image window is being evaluated, and $F(v_i, I)$ is a dot product of this projection vector onto the current window expressed as a vector.

Figure 8A:
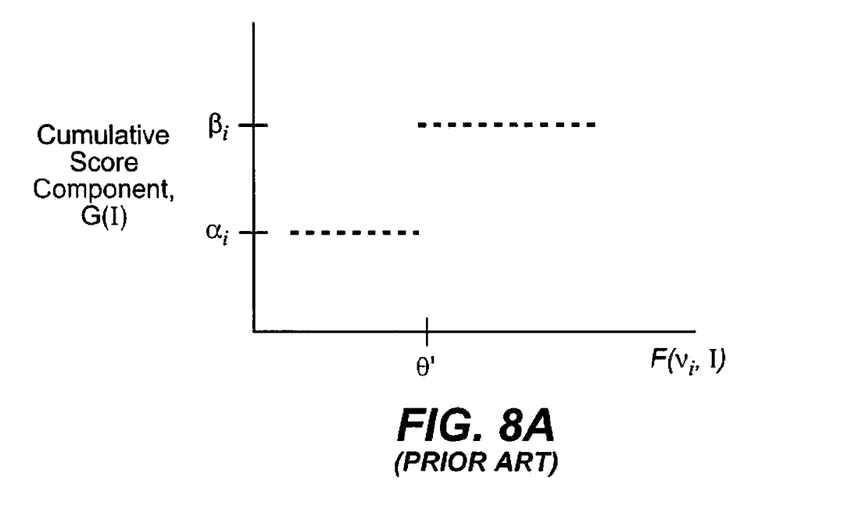
FIG. 8A shows a prior art transfer function used in the process of detecting a particular object in an image.

The use of equation 2 is illustrated in FIG. 8A. If $F(v_i, I)$ for the window is greater than $\theta_i$ then the amount added to the window's cumulative score is $\alpha_i$. But if $F(v_i, I)$ is equal to or less than $\theta_i$, the amount added to the cumulative score is $\beta_i$. The quantity $F(v_i, I)$ is compared with a single threshold $\theta_i$ to determine whether the value of the cumulative score of the current window is increased by $\alpha_i$ or by $\beta_i$. There is obviously a sharp discontinuity at the threshold $\theta_i$ in the relationship between $F(\theta_i, I)$ and the resulting cumulative score adjustments $\alpha_i$ and $\beta^i$.

Figure 8B:
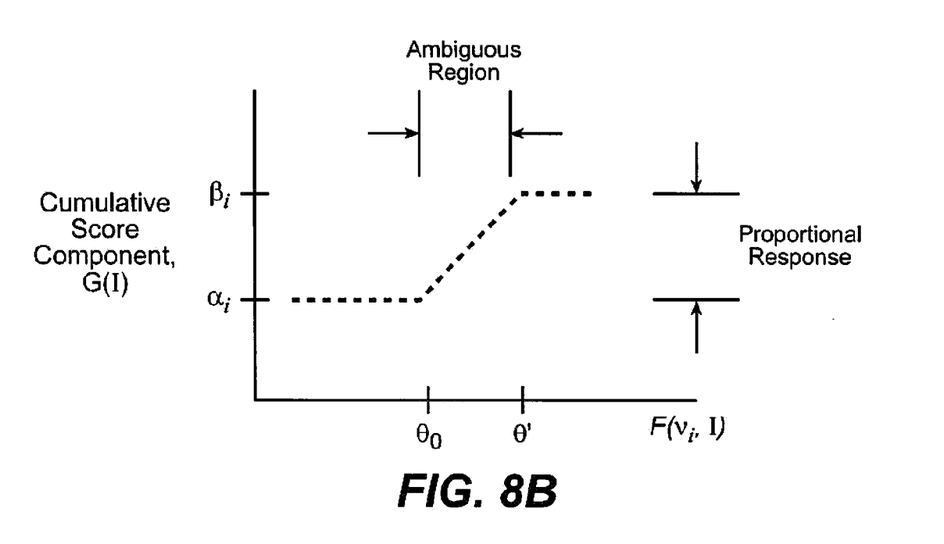
FIG. 8B shows an improvement thereover.

In the improvement being described herein, two thresholds $\theta_0$ and $\theta_1$ are used instead of a single threshold. This is illustrated in FIG. 8B. Instead of the cumulative score relationship of Equation 2 above, the following relationship illustrated by FIG. 8B is implemented:

$$G(I) = \quad \text{(Equation 3)}$$
$$\begin{cases} a & \text{if } F(v_i, I) < \theta_0 \\ \beta & \text{if } F(v_i, I) > \theta_1 \\ a + (F(v_1, I) - \theta_0)(\beta - a)/(\theta_1 - \theta_0) & \text{if } \theta_0 < F(v_i, I) < \theta_1 \end{cases}$$

This equation results in a linear interpolation being performed when $F(v_i, I)$ is between the two thresholds $\theta_0$ and $\theta_1$. In that region, the component of the cumulative score $G(I)$ is calculated to be somewhere between the values $\alpha$ and $\beta$, by the following:

$$\alpha + (F(v_i, I) - \theta_0)(\beta - \alpha)/(\theta_1 - \theta_0) \quad \text{(Equation 4)}$$

The use of two evaluation thresholds in this manner makes the resulting score component $G(I)$ more representative of the correlation between the current window and the current feature, at least when $(F(v_i, I)$ is between the two thresholds $\theta_0$ and $\theta_1$. The hardware can include parameters for selecting the $G(I)$ used for each $v_i$ feature, with some examples of $G(I)$ functions given in Equations 5, 5.2, 5.4 and 6.

Figure 9:
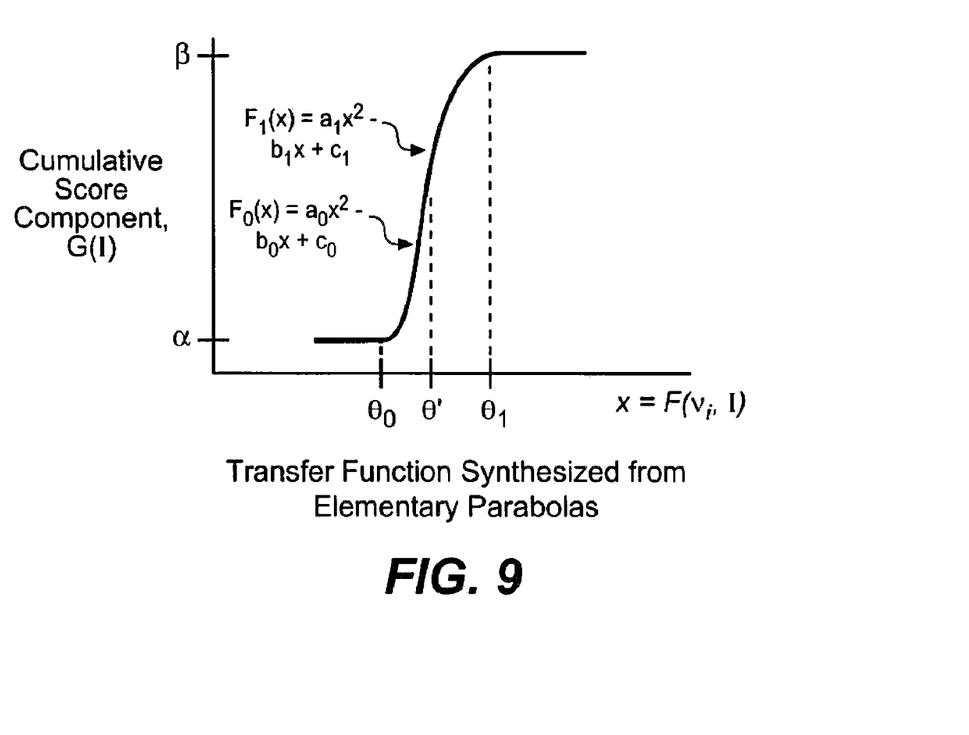
FIG. 9 illustrates a modification of the transfer function of FIG. 7B.

But an even more representative result is obtained by a non-linear interpolation between the two thresholds, with one preferred function being illustrated in FIG. 9. This function is formed of two elementary parabolas. The function $F_0(x)$ extends between the threshold value $\theta_0$ and an intermediate value $\theta'$ of $(F(v_i, I)$ that lies between $\theta_0$ and $\theta_1$. A second function $F_1(x)$ extends between $\theta'$ and $\theta_1$. These parabolic functions are selected to optimize the detection of a particular feature in the image during a calibration operation. The relationship illustrated in FIG. 9 may expressed as the following:

$$G(I) = \begin{cases} \alpha & \text{if } x < \theta_0 \\ \beta & \text{if } x > \theta_2 \\ a_o x^2 - b_0 x + c_0 & \text{if } \theta_0 < x < \theta_1 \\ a_1 x^2 - b_1 x + c_1 & \text{if } \theta_1 < x < \theta_2 \end{cases} \quad \text{(Equation 5)}$$

where: $x = F(v_i, I)$
Another embodiment is given by:

$$G(I) = a_o x^2 + b_o x \quad \text{(Equation 5.2)}$$

where: $x = F(v_i, I)$
Here, $G(I)$ describes a special parabola which always cross the axes origin. Yet another embodiment of the $G(I)$ function that can be supported is defined in the following:

$$G(I) = \begin{cases} a_0 x^2 + b_0 x & \text{if} & x < \theta_0 \\ a_1 x^2 + b_1 x & \text{if} & \theta_0 \le x < \theta_1 \\ \vdots & \vdots & \vdots \\ a_{n-1} x^2 + b_{n-1} x & \text{if} & \theta_{n-2} \le x < \theta_{n-1} \\ a_n x^2 + b_n x & \text{if} & \theta_{n-1} \le x \end{cases} \quad \text{(Equation 5.4)}$$

where: $x = F(v_i, I)$
Although two parabolic functions are used in FIG. 9 and Equation 5, the transfer function may be formed of more than two parabola segments connected together. The following expresses the most general extension of this concept:

$$G(I) = \begin{cases} a & \text{if} & x < \theta_0 \\ \beta & \text{if} & x > \theta_n \\ a_o x^2 - b_0 x + c_0 & \text{if} & \theta_0 < x < \theta_1 \\ & \vdots & \\ a_{n-1} x^2 - b_{n-1} x + c_{n-1} & \text{if} & \theta_{n-1} < x < \theta_n \end{cases} \quad \text{(Equation 6)}$$

where: $x = F(v_i, I)$
It should be noted that the threshold levels $\theta_0$ and $\theta_1$, as well as some or all of the other constants in the equations given above, are typically unique to a particular feature set with which the image window is being compared. That is, there are typically a different set of some or all of these constants used for each feature set.

A Modified Embodiment

The above-described technique calculates a score indicating whether one object feature set exists in an individual window and then compares that score with a threshold to determine whether data of the window should be further processed. This is done for the individual windows across the image frame with respect to one feature set and then any remaining windows (those having a score in excess of the threshold) are further processed with data of the next in order feature set, and so on until the image has been processed in many stages with respect to all the feature sets.

An alternative is to rank the scores of the individual windows for the same feature set and select for further processing those windows having the higher scores. For example, the scores of the various windows may be ranked in order between the highest and lowest scores. Those windows having the higher scores are selected for further classification, while those having the lower scores are rejected at this point as highly unlikely to contain the object. Rather than comparing the individual window scores with an absolute predetermined threshold score, the windows may be classified into one of two groups based on their relative ranking within the list of scores. For example, the windows having the top one-third of the scores may be selected for further processing while the other two-thirds of the windows are rejected and no longer considered. This prunes the list of windows at each stage of the processing and therefore reduces the total amount of processing required. This procedure is then repeated at each stage until all of the stages for the given image frame have been completed, at which time the windows of the image containing the face or other object are identified.

An Implementation

Rather than making the calculations of FIG. 3 only in response to the camera user indicating that he or she is about to take a picture, it is more convenient to perform the processing on data of transitory preview images that are regularly acquired by many camera systems. The preview images are typically acquired at a rate of a plurality of frames-per-second, as high as 30, in order to allow the camera to be maintained ready to take a picture without significant delay. This is done by making calculations necessary to take or process picture data from the data of each preview image in turn. Preview images typically have a lower resolution than those captured and saved by the user, which results in less data to be processed than in the case of a full resolution captured image. In a camera having a sensor with several mega-pixels that provide a high resolution image, the preview images may have less than one-third the number of pixels, and often less than ten percent of them. The processing of FIG. 3 may also be performed on data of preview images, so that the presence of any object and its location within the image are known a fraction of a second before the actual full resolution picture is captured by the user. The results of the object detection processing of preview image data may then be used by the camera when acquiring the final high resolution image. Additionally, the amount of processing of any one preview image may be reduced based on calculations already made on a prior preview image.

Figure 10:
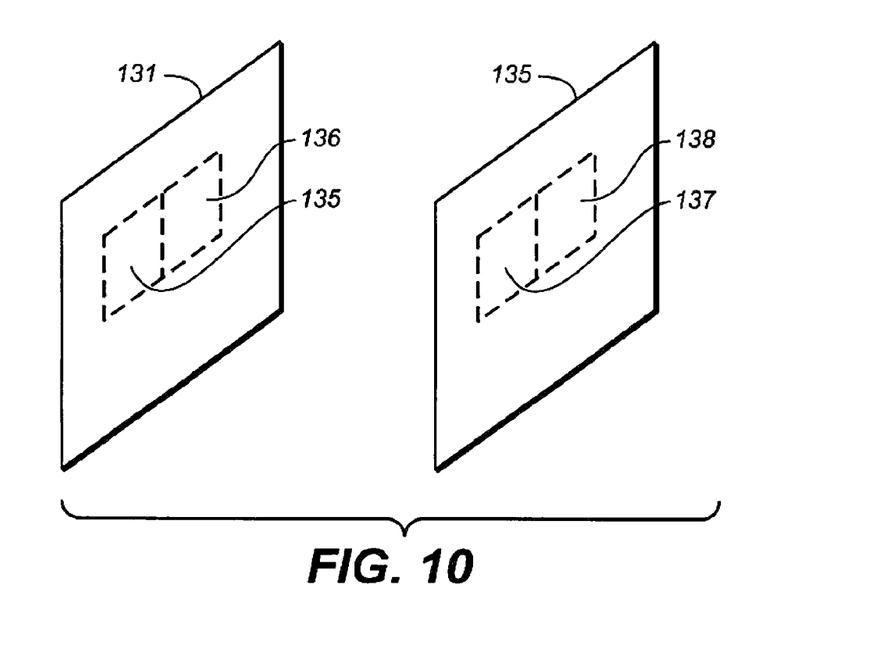
FIG. 10 shows application of the processing techniques herein to preview images.

FIG. 10 illustrates this. A first preview image 131 is followed by another preview image 133. These images have respective windows 135, 136 and 137, 138 in the same relative locations within their respective windows. Rather than automatically performing the calculations for each of the windows 137 and 138, the image portions in those windows are first compared with those of the windows 135 and 136 to determine whether there is any difference. If not, then the calculations need not be performed for the second image 133, at least for the windows where there has been no change. This significantly reduces the amount of processing of the data of each preview image and therefore that necessary to detect an object in the final high resolution image that is captured.

Figure 11:
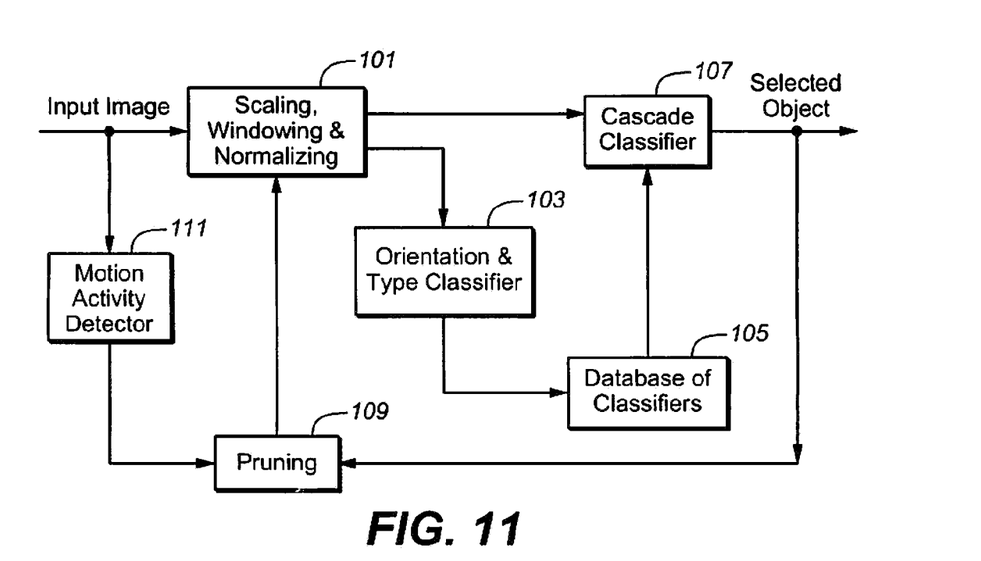
FIG. 11 is a block diagram that illustrates a specific implementation of the object detection in a digital image acquisition device.

FIG. 11 illustrates the described overall object detection process for an image such as one of sequential preview images. A first set of functions for a newly received image are indicated in a block 101. The intensity or amplitude of the image is normalized either over the entire image or over individual windows (see FIG. 4) that are defined within the frame of the image. Normalization is preferably performed without use of data from any other image. The image may be scaled down into several differently sized images, either from the total image or individual portions of it that are defined within windows. As described above, scaling is performed in order to be able to compare faces or other objects having different sizes with data of a feature of the object that has a fixed size, since the sizes of the image frame and individual windows within it remain the same.

The image window is then oriented and its type classified at 103 of FIG. 11, as discussed above with respect to FIGS. 6 and 7. Data of a feature set with which the data of the image windows are being compared are then output from a database 105 that is stored in a non-volatile memory of the camera or other electronic image acquisition device. The feature set data sent to a classifier 107 depends upon the orientation and type of the object that is being assumed, as determined at 103. The classifier 107 then evaluates the scaled and normalized window data with respect to the feature set data read out of the database 105. An output of the classifier 107 is an identification of the individual windows within the current image frame that are determined by the processing to contain a face or other object being detected.

The windows of a given image that have been evaluated with respect to one feature set are then pruned at 109 to select only some of them for evaluation with respect to the next feature set. In the processing described with respect to FIG. 3, individual windows are eliminated at each stage when their scores do not meet a threshold. This is indicated in FIG. 11 by the pruning 109 receiving the scores of individual windows from the classifier 107, and then returning to the processing 101 for only those windows where the scores exceed the set threshold. The pruning is done primarily to reduce the amount of processing by eliminating certain windows from further examination, which also increases the speed with which the target windows for a given image are identified. The process then continues by the classifier 107 evaluating these selected windows with respect to data of another feature set that are output from the database 105. This loop of FIG. 11 is traveled for each window of an image and for each feature set until a relatively few number of windows are identified as target windows; that is, windows that have a high likelihood of containing a face or other object being investigated. That is the output of FIG. 11.

If the image data acquisition device includes a motion detector 111, the existence or absence of motion of the device or objects within the image may be utilized by the pruning function 109. Motion is typically detected in digital cameras between preview images in order to then compensate for it, or as part of a compression algorithm for the resulting image data, or possibly other purposes. If the user is shaking the camera while an image is being captured, motion of the entire image is detected from one preview image to the next. But motion may also be detected in individual portions or windows of an image, which then detects motion of one or more objects within the scene. The pruning 109 may use such motion information to detect changes between two successive preview images, and thereby eliminate calculations associated with areas of the image that have not changed. If an object was detected or not detected in an area of the image that has not moved between two successive preview images, for example, then the data for that area need not be processed in the second image to look for an object. The result will be the same in such areas of both objects. Therefore, data of only those windows of each preview image that, when compared to the same windows of the immediately preceding preview image have moved or otherwise changed, are processed to detect whether an object exists or not.

Figure 12:
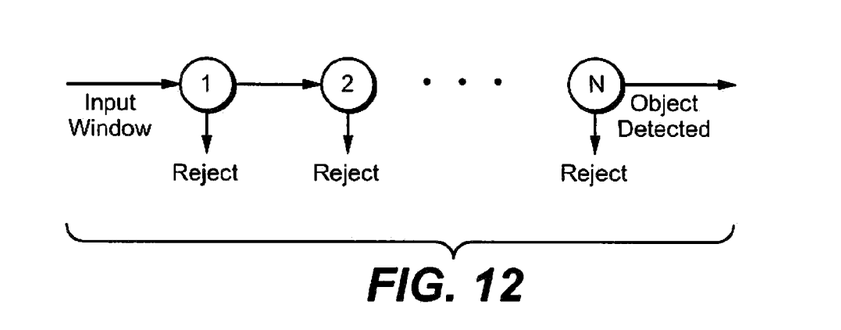
FIG. 12 shows an operation of one of the blocks in FIG. 9.

FIG. 12 illustrates the overall operation of FIG. 11 to classify windows. N number of classifying stages are cascaded together, one for each of the different feature sets, which may be considered to be primarily located in the classifier 107 of FIG. 11. A given window of a given image first passes through processing stage 1. If this window is selected for further processing because of its high score resulting from evaluation of the window with respect to the first feature set, then it proceeds to stage 2 for evaluation with respect to a second feature set, and so on. But if the window does not receive a sufficient score in the first stage, it is rejected and is then processed no further. It has then been determined that this window is unlikely to contain the face or other object of interest. Even if the window does obtain a sufficient score in the first stage, it can be rejected by the second stage because it is there evaluated with respect to a different feature set. After all the windows of the image are processed in this way, the output of the classifier 107 is a list of the target windows.

CONCLUSION

Although the various aspects of the present invention have been described with respect to exemplary embodiments thereof, it will be understood that the present invention is entitled to protection within the full scope of the appended claims.

What is claimed is:

1. A method comprising:
defining a plurality of windows within an image;
assigning scores to individual windows of the plurality of windows by
evaluating data of the image within the individual windows with respect to stored data of a set of features of a particular type of object;
for each unique pair of one window of the plurality of windows and one feature of the set of features, determining a relationship between a result of said evaluating and a plurality of different thresholds, to determine a plurality of relationships for each of the windows; and
assigning a score to each window of the plurality of windows based on the determined relationships for said window; and
determining a likelihood that the particular type of object is present the image based on the assigned scores.

2. The method of claim wherein said assigning scores comprises:
for each individual window, comparing the result of said evaluating against a first threshold and a second threshold;
if the result is above a higher of the first and second thresholds, assigning a first value to the score;
if the result is below a lower of the first and seco thresholds, assigning a second value to the score; and
if the result is between the first and second thresholds, assigning to the score a value interpolated between the first and second values.

3. The method of claim 2, wherein assigning to the score a value interpolated between the first and second values comprises performing interpolation between the first and second values non-linearly by a transfer function formed of at least two parabolic functions.

4. The method of claim 1, wherein assigning a score to a current window, of the plurality of windows, comprises comparing a dot product of a vector of the image projected onto the current window with a vector of the current window.

5. The method of claim 4, wherein:
the dot product is represented by $F(v_i, I)$, where $v_i$ is a vector projected onto the current window I,
the first and second thresholds are represented by $\theta_0$ and $\theta_1$, respectively, where $\theta_1 > \theta_0$,
the first and second values are predetermined values represented by $\alpha$ and $\beta$, respectively, where $\beta > \alpha$, and
the score is interpolated between the first and second predetermined when $\theta_0 < F(v_i, I) < \theta_1$ and is represented by $(\alpha + (F(v_i, I) - \theta_0)(\beta - \alpha)/(\theta_1 - \theta_0))$.

6. The method of claim 4, wherein
the dot product is represented by $F(v_i, I)$, where $v_i$ is a vector projected onto the current window I,
the first and second thresholds are represented by $\theta_0$ and $\theta_1$ respectively, where $\theta_1 > \theta_0$,
the first and second values are predetermined values represented by $\alpha$ and $\beta$, respectively, where $\beta > \alpha$, and
the score is interpolated between the first and second predetermined values when $\theta_0 < F(v_i, I) < \theta_1$ by a transfer function made of at least two parabolic functions.

7. The method of claim 6, wherein the transfer function includes at least $a_0 [F(v_i, I)]^2 - b_0 F(v_i, I) + c_0$ when $\theta_0 < F(v_i, I) < \theta'$ and $(a_1 [F(v_i, I)]^2 - b_1 F(v_i, I) + c_1$ when $\theta'' < F(v_i, I) < \theta_1$, wherein $a_0$, $a_1$, $b_0$, $b_1$, $c_0$ and $c_1$ are constants and $\theta'$ and $\theta''$ fixed threshold values intermediate of $\theta_1$ and $\theta_2$.

8. The method of claim 7, wherein $\theta'$ and $\theta''$ are equal.

9. The method of claim 4, wherein:
the dot product is represented by $F(v_i, I)$ where $v_i$ is a vector projected onto the current window I,
the first and second thresholds are represented by $\theta_0$ and $\theta_1$, respectively, where $\theta_1 > \theta_0$,
the first and second value are determined by parabolic transfer functions, and
the score is interpolated between the first and second values when $\theta_0 < F(v_i, I) < \theta_1$ by a transfer function made of one or more parabolic functions.

10. The method of claim 1, wherein said evaluating comprises, for a window, rotating the stored data with respect to data of the image about an axis perpendicular to a plane of the window by changing a parameter of the stored data.

11. An electronic image acquisition device comprising:
an input interface circuit to receive data of an output of an image sensor, the data representing an image; and
processor circuitry coupled to the input interface circuit to receive the data and to provide processed data of the image, wherein the processor circuitry is configured to detect a likelihood that an object of a particular type is present within the image by processing that includes:
defining a plurality of windows within an image;
assigning scores to individual windows of the plurality of windows by
evaluating data of the image within the individual windows with respect to stored data of a set of features of a particular type of object,
for each individual window, determining relationships between a result of said evaluating and a plurality of different thresholds, and
assigning a score to each individual window based on the determined relationships for said window.

12. The electronic acquisition device of device of claim 11, wherein said assigning scores comprises:
for each individual window, comparing the result said against a first threshold and a second threshold;
if the result is above a higher of the first and second thresholds, assigning first value to the score;
if the result is below a lower of the first and seco thresholds, assigning a second value to the score; and
if the result is between the first and second thresholds, assigning to the score value a value interpolated between the first and second values.

13. The device of claim 11, further comprising said image sensor.

14. The device of claim 13, wherein said image sensor is a two-dimensional image sensor.

15. The device of claim 13, further comprising:
an optical system that projects an image of an object scene outside of the device onto the sensor.

16. The device of claim 11, wherein assigning to the score a value interpolated between the first and second values comprises performing interpolation between the first and second values non-linearly by a transfer function formed of at least two parabolic functions.

17. The device of claim 11, wherein the processing of the image processing circuitry to evaluate the likeihood of the presence of the set of features in the individual windows includes comparing a dot product of a vector of the image projected onto a current one of the windows with a vector of the current window.

18. The device of claim 11, wherein said evaluating comprises, for a window, rotating the stored data with respect to data of the image about an axis perpendicular to a plane of the window by changing a parameter of the stored data.

19. The method of claim 1, wherein said assigning a score to each individual window comprises:
calculating a weight value for each individual window and each feature of the set of features based on the determined relationships; and
assigning a score to each individual window by cumulating the weigh values for said individual window and each feature of the set of features.

* * * * *